US005169659A

United States Patent [19]

Fleischmann et al.

[11] Patent Number: 5,169,659

[45] Date of Patent: Dec. 8, 1992

[54] HOT CLIMATE BATTERY

[75] Inventors: Charles W. Fleischmann, Blue Bell; Chester R. Sinnk, Boyertown; William E. Veit, Wyomissing Hills; David Beidler, Boyertown; A. P. Rendall, Shillington, all of Pa.

[73] Assignee: Exide Corporation, Reading, Pa.

[21] Appl. No.: 621,237

[22] Filed: Nov. 30, 1990

Related U.S. Application Data

[63] Continuation-in-part of Ser. No. 396,383, Aug. 18, 1989, Pat. No. 5,116,697.

[51] Int. Cl.$^5$ .............. H01M 4/72

[52] U.S. Cl. .............. 429/126; 429/233; 429/241

[58] Field of Search .............. 429/60.86, 120, 126, 429/211, 233, 241

[56] References Cited

U.S. PATENT DOCUMENTS

| | | | |
|---|---|---|---|
| 1,475,434 | 11/1923 | Kershaw et al. | 429/126 |
| 2,625,574 | 1/1953 | Fuller | 429/241 X |
| 2,634,304 | 4/1953 | Stoertz | 429/241 X |
| 2,803,690 | 8/1957 | Stevens | 429/126 |
| 3,174,878 | 3/1965 | Peters | 429/60 |
| 3,989,539 | 11/1976 | Grabb | 429/241 |
| 4,076,901 | 2/1978 | Fritz et al. | 429/126 X |
| 4,118,553 | 10/1978 | Buckethal et al. | 429/234 |

*Primary Examiner*—Anthony Skapars
*Attorney, Agent, or Firm*—Frank J. Benasutti

[57] ABSTRACT

A battery for operation in hot dry climates is provided with unique plate grids and a floated insulating layer over the electrolyte.

3 Claims, 3 Drawing Sheets

HOT CLIMATE BATTERY

This application is a continuation in part of U.S. Ser. No. 07/396,383 filed Aug. 18, 1989, now U.S. Pat. No. 5,116,697.

FIELD OF THE INVENTION

This invention relates to electric storage batteries, and particularly to batteries intended for use in hot climates.

BACKGROUND OF THE INVENTION

Storage batteries used for starting, lighting and ignition ("SLI batteries") in vehicles operated in hot arid climates are prone to failure more frequently than those in vehicles operated in more temperate climates. Evaporative water loss from the electrolyte solution caused by the hot arid environment is a major contributing factor to the increased failure rate. The reduction of such evaporative water loss is addressed by the floated insulating layer of closed cell particulate material disclosed in the parent application identified above. However, in the total design of a hot climate battery, additional features are desirable to ameliorate the effects of high temperatures and low humidity.

From analysis of failed batteries operated in a desert climate, it appears that primary failure modes attributable to the adverse climate include corrosion of the positive grids, positive plate growth resulting in short circuit contact against the underside of the negative intercell strap, and open circuits due to failure of the intercell welds.

Grid corrosion, principally the excessive creation of lead sulphate, can result from the exposure of the plates above the electrolyte solution, and from a highly concentrated electrolyte. Evaporative water loss both reduces and concentrates the solution. Consequently, it is generally recommended maintenance practice to add water as necessary to maintain the electrolyte level and specific gravity. It is also known that the temperature of the solution increases sulphation, and that lowering the specific gravity below the normal range tends to offset the effect of the temperature increase. In view of this knowledge, a battery specifically designed for such environment should preferably reduce evaporative water loss and have a lower specific gravity of electrolyte solution than a battery intended for temperate climates.

Positive plate growth arises from the shedding of active material from the plates, which is increased by high temperature and over-concentrated electrolyte. The exposed lead of the grid then leads to the formation of lead peroxide at irregular sites on the positive plates. This formation frequently occurs at the top corners of the positive plate near the surface of the electrolyte, as the growth creates stresses on the plate grids which cause them to buckle upward at the corners in the direction of growth. Buckling is accelerated by the design of the most prevalent modern grids, in which the vertical grid members have been replaced by thin grid wires directed radially inward toward the top center of the grid to provide better conduction paths to the grid lug. In addition, the number of horizontal grid wires in these "radial" grids is usually at least equal to, and in many instances greater than, the number of radial wires. This creates a grid composed of many small parallelograms with their angled shorter sides already directed away from the grid sides and which offers little resistance to upward buckling of the grid sides. Consequently, it is desirable to develop a grid design which resists upward buckling and to use additional means to reducing active material shedding in a hot climate battery.

Failure of the intercell weld is also a corrosion phenomena related to evaporative water loss. The weld is normally located near the surface of the electrolyte in a filled battery. Water loss increases specific gravity and lowers the electrolyte level, which exposes the weld and accelerates its corrosion, eventually leading to failure. Hence, it is desirable to increase electrolyte level and to reduce evaporative water loss in a hot climate battery.

BRIEF SUMMARY OF THE INVENTION

A battery designed for operation in hot dry climates is provided with unique plate grids and a floated insulating layer over the electrolyte, and may further include a higher ratio of positive active material to negative active material, increased electrolyte volume and lower specific gravity than in an equivalent battery, to ameliorate the effects of heat and evaporative water loss. The grids have a reverse rectilinear grid pattern in which heavier vertical grid wires outnumber lighter horizontal wires by a two-to-one ratio and a radial wire angles from each bottom corner to the center lug. The insulating layer is preferably at least a quarter-inch of closed cell foam particles floated on the electrolyte. The ratio of positive to negative active material is preferably in the range between 1.26 and 1.44 to 1. The electrolyte volume is approximately 15% greater than equivalent batteries and the specific gravity is lowered to approximately 1.250.

DETAILED DESCRIPTION

Figure 1:
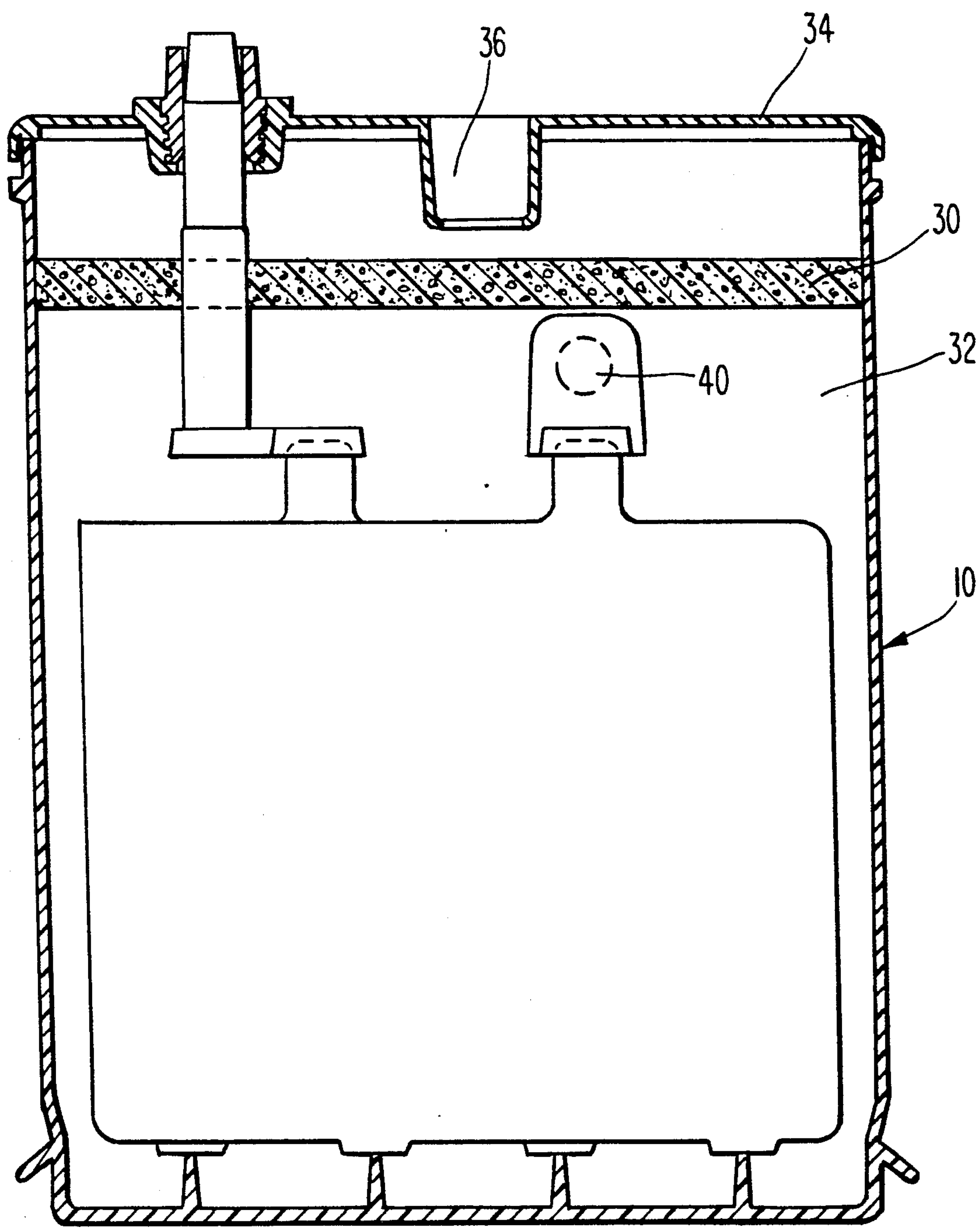
FIG. 1 is a cross section of a hot climate battery according to the invention showing the filled electrolyte level, the floated insulating layer and the location of the intercell welds.

The battery 10 depicted in FIG. 1 is designed specifically for an intended use in excessively hot arid climates, and consequently includes a combination of features differing from the typical automobile battery designed for temperate or cold climates, as described in detail hereafter. The focus in this description will be placed on those differences, as persons skilled in the art will recognize the features depicted but not described, such as case, cover and terminals, which are common to automotive "SLI" batteries, without specific description.

Figure 3:
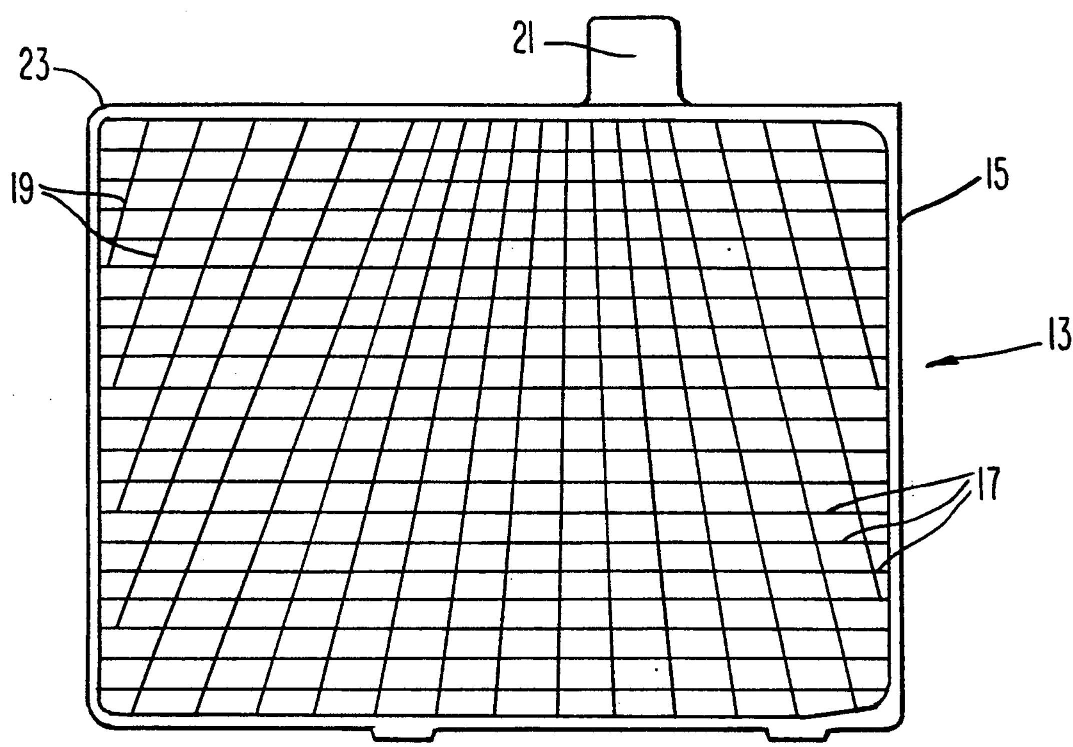
FIG. 3 is a front view of a typical radial pattern grid of the prior art.
Figure 2:
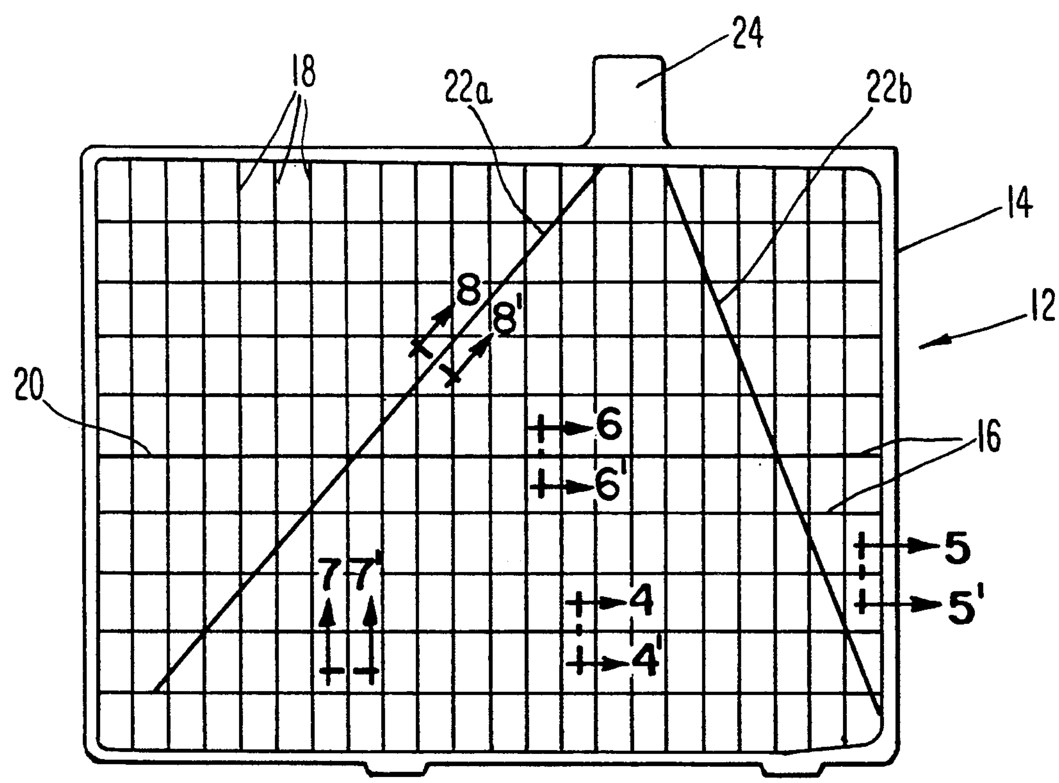
FIG. 2 is a front view of a grid according to the invention.

The grids used to fabricate the positive plates are designed to resist positive plate growth and the warping associated with stresses caused by excessive growth. An example of such grid 12 is depicted in FIG. 2; while for comparison an example of a typical modern radial grid 13 is depicted in FIG. 3. The radial grid 13 typically has a lead frame 15 surrounding a web of thin lead wires in which there are a plurality of horizontal wires 17 and an equal or slightly lesser number of diagonal wires 19 which angle upward and inward from the lower sides of the frame toward the top of the frame in the vicinity of the plate connector lug 21 (hence the common description "radial grid"). This design is intended to improve the internal conductivity of the plate toward the lug, but it does not provide good structural resistance to upward warping of the corners, particularily of the corner 23 located away from the lug 21. As apparent from FIG. 3, the grid pattern is a web of small parallelograms slanted toward the center, with the parallelograms becoming longer toward the sides. This pattern focuses warping due to growth stresses in the upward direction at the corners, particularily the corner 23 away from the lug. Since the lugs on the negative plates and the intercell connector strap between the negative plate lugs is located over the plates toward the corners 23 of the positive plates, upward warping can bring the corners 23 out of the electrolyte and create an accelerated growth site at which the deposited lead peroxide may eventually bridge to the negative stap and cause an internal short circuit. This phenomina has been observed as a frequent failure mode in conventional batteries operated in hot arid climates.

As shown in FIG. 2, the grid 12 of the present invention is designed to resist upward warping at the corners. It has a frame 14, and grid wires which are horizontal 16 and vertical 18, rather than radial. The ratio of vertical to horizontal wires is approximately 2 to 1 (20 vertical to 10 horizontal in FIG. 3), which creates a "reverse rectilinear" grid pattern of upward directed rectangles. The center horizontal wire 20 and all of the vertical wires 18 have greater thickness than the other horizontal wires. Two thick diagonal wires ***22a*,*22b* angle from the lower corners of the frame to the positive lug 24** to increase conductivity to the lug. This grid pattern and thicker wires provide a structural resistance to growth stresses which inhibits upward warping at the corners.

Figure 4:
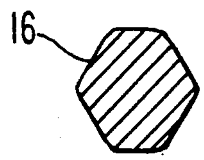
FIG. 4 is a section of a horizontal grid wire in the location shown by the line 4—4' of FIG. 2.
Figure 5:
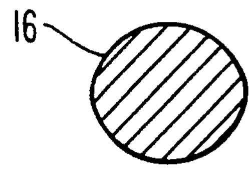
FIG. 5 is a section of a horizontal grid wire in the location shown by the line 5—5' of FIG. 2.
Figure 6:
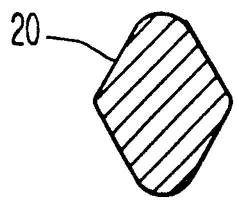
FIG. 6 is a section of the center horizontal grid wire as shown by the line 6—6' of FIG. 2.
Figure 7:
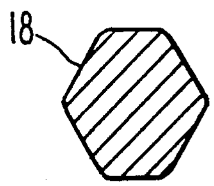
FIG. 7 is a section of a vertical grid wire as shown by the line 7—7' of FIG. 2.
Figure 8:
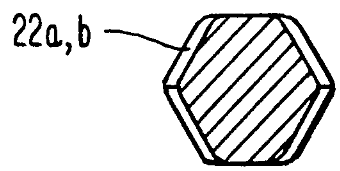
FIG. 8 is a section of a diagonal grid wire as shown by the line 8—8' of FIG. 2.

FIGS. 4 and show the sectional shape and dimensions of the horizontal wires 16, which begin tapering near the sides of the frame from the section shown in FIG. 4 into the slightly oblong section shown in FIG. 5. The sectional shape and dimensions of the center horizontal wire 20 is shown in FIG. 6, the vertical wires 18 FIG. 7, and the radial wires ***22a*, *22b* in FIG. 8**. The larger dimensions of the vertical wires further resist warping upward at the corners.

The positive plates are provided with a greater ratio of active material compared to the negative plates than is normally seen in temperate climate batteries, in order to prevent depletion through overdischarge. Specifically, the ratio of positive active material to negative active material is preferably in the range of 1.26–1.45 to 1. For example, in a BCI group 24 size battery, each of the positive plates contains 96.5 grams of active material with 0.068 inch pasted thickness, while the negative plates contain 66.6 grams of material at 0.054 thickness (1.45:1 ratio). Persons skilled in the art will recognize that conventional automobile batteries typically have an active material ratio in the range of 0.85–1.05:1 positive to negative.

The volume of electrolyte is increased approximately 15% over a corresponding sized and rated battery intended for temperate climates, but the specific gravity is reduced to 1.250, as contrasted with the 1.295 to 1.300 sp. gr. range of conventional batteries.

Returning to the battery 10 shown in section in FIG. 1, an insulating layer 30 of closed cell foam particles is floated on the surface of the electrolyte 32 to reduce evaporative water losses. While other floating materials could be used, closed cell foam particles having sizes less than one quarter inch in longest section and density in the range of 0.02 to 0.05 grams per cubic centimeter are strongly preferable, as described in greater detail in the parent application. The layer 30 should be at least one quarter inch thick above the electrolyte, and not allow gaps to form which will allow evaporation. The very low density foam particles will meet this requirement if injected into the filled battery through the vent holes 36 in sufficient quantity, as they float high on the electrolyte and quickly spread to a uniform thickness of particles piled on top of each other, and will reform into a uniform thickness after the battery is bounced or tilted. The closed cell property keeps the particles from absorbing or wicking up the electrolyte and from forming a wetted paste. Examples of suitable closed cell material are described in the parent application. While the thickness of the layer 30 should be at least one quarter inch, it should not fill the entire space between the electrolyte and the cover 34, otherwise it may cause pumping of the electrolyte to the vents 36.

The intercell welds 40 are lowered by the increased electrolyte volume to keep them submerged in the electrolyte even after considerable electrolyte loss. The diameter of the welds 40 is preferably about 0.5 inches to further resist separation due to corrosion.

We claim:

1. An electric storage battery adapted for use in a hot, arid climate, comprising:

a battery case and cover enclosing positive and negative electrical element plates and an electrolyte solution;

an insulating layer composed of foam particles floated on the top of the electrolyte; and the positive element plates being formed on grids, comprising:

(a) a generally rectangular frame having on its top side a lug for connecting the positive plates, (b) a plurality of horizontal grid wires, (c) a plurality of vertical grid wires having a greater cross-sectional area than the horizontal grid wires, other than the center horizontal grid wire; the number of vertical grid wires being approximately twice the number of horizontal wires, (d) two diagonal grid wires, each extending from the vicinity of the bottom corner of the frame of the lug and being oriented such that each is in a different quadrant when viewed in plan elevational view defined by horizontal and vertical axis passing and intersecting through the lug.

2. A battery as in claim 1, in which the particles have sizes less than one-quarter inch in longest section and density in the range of 0.02 to 0.05 grams per cubic centimeter.

3. The battery of claim 1 wherein the diagonal wires have a cross-sectional area which increases when viewed in the direction of the corner toward the lug.

* * * * *